United States Patent
Fourrey et al.

(10) Patent No.: US 7,240,950 B2
(45) Date of Patent: Jul. 10, 2007

(54) SEAT THAT IS RETRACTABLE INTO THE FLOOR

(75) Inventors: François Fourrey, Corquilleroy (FR); Fabrice Lesbats, Sucy En Brie (FR); David Epaud, Cerny (FR); Sébastien Vankerckvoorde, Ris-Orangis (FR)

(73) Assignee: Faurecia Sieges D'automobile, Nanterre (FR)

( * ) Notice: Subject to any disclaimer, the term of this patent is extended or adjusted under 35 U.S.C. 154(b) by 0 days.

(21) Appl. No.: 11/262,302

(22) Filed: Oct. 27, 2005

(65) Prior Publication Data

US 2006/0103175 A1 May 18, 2006

(30) Foreign Application Priority Data

Oct. 29, 2004 (FR) .................................. 04 11601

(51) Int. Cl.
*B60N 2/02* (2006.01)
*B60N 2/32* (2006.01)

(52) U.S. Cl. .......................................... 296/66; 297/15

(58) Field of Classification Search ................. 297/15, 297/340; 296/66, 65.09
See application file for complete search history.

(56) References Cited

U.S. PATENT DOCUMENTS 5,755,491 A 5/1998 Baloche et al.

2005/0035621 A1 2/2005 Moriyama et al.

FOREIGN PATENT DOCUMENTS

| DE | 100 11 545 | 11/2000 |
|----|------------|---------|
| FR | 2 677 601 | 12/1992 |
| FR | 2 743 764 A1 | 7/1997 |
| FR | 2 772 319 | 6/1999 |
| FR | 2 848 928 | 6/2004 |
| FR | 2 849 630 | 7/2004 |

OTHER PUBLICATIONS

French Preliminary Search Report FR 0411601; report dated Jun. 21, 2005.

*Primary Examiner*—Milton Nelson, Jr.
(74) *Attorney, Agent, or Firm*—Miller, Matthias & Hull (57) ABSTRACT

The invention relates to a vehicle seat comprising a seat back, a seat proper connected to the seat back, a link mechanism for fastening the seat to the floor, and enabling the seat to move between a retracted position and a deployed position, the mechanism comprising at least a first connecting rod hinged to the floor and to the seat back, and the seat further comprising a guide mechanism comprising a guide fastened to the floor with the bottom portion of the seat back being guided therealong between the retracted position and the deployed position. In the seat, the rear portion of the seat proper is mounted to pivot relative to the bottom portion of the seat back, and the link mechanism further comprises a connection piece mounted to move relative to the floor and hinged to the front portion of the seat proper.

16 Claims, 7 Drawing Sheets

SEAT THAT IS RETRACTABLE INTO THE FLOOR

FIELD OF THE INVENTION

The present invention relates to retractable vehicle seats.

More particularly, the invention relates to a vehicle seat comprising a seat back having a bottom portion and a top portion, and a seat proper having a front portion and a rear portion. The seat further comprises a link mechanism designed to secure the seat to the floor of the motor vehicle, and enabling it to be moved between a retracted position and a deployed position, the mechanism including at least one first connecting rod presenting a bottom end hinged to the floor and a top end hinged to the seat back. The seat also includes a guide mechanism comprising a guide fixed to the floor and along which the bottom portion of the seat back is guided between the retracted position and the deployed position.

BACKGROUND OF THE INVENTION

Document FR-A-2 772 319 describes an example of such a vehicle seat in which the seat proper is pivotally mounted, substantially in the middle of its two side faces, on the first connecting rod, and, when in the deployed position, is blocked on the bottom portion of the seat back. To do this, the rear portion of the seat proper includes a cross-member that is kept engaged in a hook disposed in the bottom portion of the seat back.

To go from one position to the other, that type of seat requires two distinct operations to be performed, comprising both positioning the seat back, and also blocking or unblocking the seat proper in the seat back.

OBJECTS AND SUMMARY OF THE INVENTION

An object of the present invention is to provide a seat that is more easily retracted or deployed than those existing in the prior art.

To this end, according to the invention, in a vehicle seat of the kind in question, the rear portion of the seat proper is mounted to pivot relative to the bottom portion of the seat back, and the link mechanism further comprises a connection piece presenting a bottom end mounted movably relative to the floor, and a top end hinged to the front portion of the seat proper.

By means of these dispositions, moving the seat back causes the seat proper to be moved simultaneously towards one or other of the retracted or deployed positions, thus making the seat easier to handle.

In various embodiments of the vehicle seat of the invention, recourse may optionally also be had to one or more of the following dispositions:

the connection piece is a second connecting rod whose bottom end is for hinging to the floor about a transverse axis perpendicular to said second connecting rod;

the bottom end of the connection piece is mounted to slide in a rail for fastening to the floor;

the bottom portion of the seat back includes a wheel and the guide is a rail on which the wheel slides;

the seat further comprises a hinge mechanism connected to the seat back and adapted to modify the angle of inclination of the seat back about a transverse axis perpendicular to said hinge mechanism;

the hinge mechanism is situated at the bottom end of the first connecting rod connected to the floor and is adapted to allow pivoting between the first connecting rod and the floor;

the hinge mechanism presents a first cheek plate for being connected to the floor and a second cheek plate formed by the first connecting rod;

including a locking mechanism suitable for allowing or preventing pivoting of the seat back relative to the first connecting rod;

the locking mechanism comprises a hook secured to a first element selected from the first connecting rod and the seat back, and a peg secured to a second element selected from the first connecting rod and the seat back, and different from the first element, the hook and the peg co-operating in such a manner as to allow or prevent rotation of the seat back relative to the first connecting rod;

the hook is actuated so as to release the peg by using an external control;

the seat includes a control mechanism co-operating with the locking mechanism to cause the hinge mechanism to be locked or unlocked automatically during pivoting of the seat back relative to the first connecting rod;

the control mechanism includes an abutment situated on the seat back to co-operate with a cam in such a manner that pivoting of the seat back about the first connecting rod from the deployed position towards the retracted position causes the hinge mechanism to be unlocked automatically; and the seat is adapted so that the seat back co-operates with the floor to form a surface that is substantially plane when the seat is in the retracted position.

Furthermore, the invention also provides a vehicle having a floor and a seat in accordance with the invention.

BRIEF DESCRIPTION OF THE DRAWINGS

Other characteristics and advantages of the invention appear from the following description of an embodiment thereof, described by way of non-limiting example and with reference to the accompanying drawings.

In the drawings.

In the various figures, elements that are identical or similar are designated by the same references.

MORE DETAILED DESCRIPTION

The seat of the invention may be placed in any type of vehicle, but it is particularly suitable for minivan or peoplecarrier type vehicles. The invention is particularly applicable to so-called "third row" seats located at the rear end of the vehicle, and that need to present a high degree of modularity in order to modify the usable space in the vehicle trunk.

Figure 1:
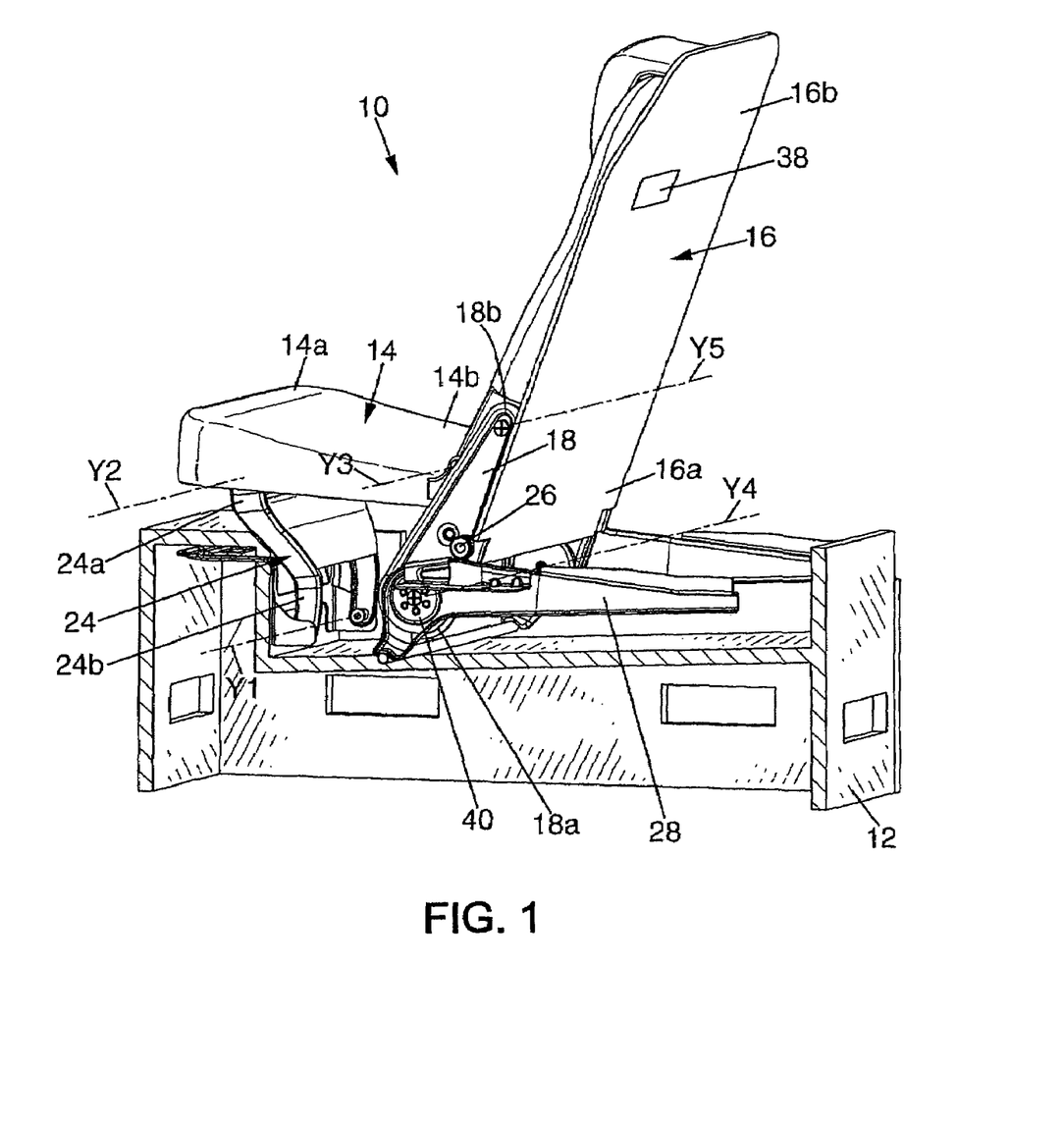
FIG. 1 is a perspective view of a seat of the invention arranged on the floor of a vehicle, the seat being shown in the deployed position.

As shown in FIG. 1, the seat 10 is placed on a portion of floor 12 shown in longitudinal section so as to reveal a housing into which the seat 10 is folded when in the retracted position.

The seat 10 comprises a seat proper 14 adapted to receive the pelvis and the thighs of an occupant. The seat proper 14 extends from a front portion 14a to a rear portion 14b substantially parallel to a longitudinal direction X.

The seat also comprises a seat back 16 designed to receive the back of a user. The seat back extends between a bottom portion 16a and a top portion 16b, in a vertical direction Z.

The seat 10 of the invention further comprises a link mechanism comprising a first connecting rod 18 presenting a bottom end 18a connected to the floor 12 and a top end 18b connected to the seat back 16. Each end 18a, 18b is hinged about a respective transverse axis Y4, Y5 extending perpendicularly to said first connecting rod 18.

The link mechanism further comprises a connection piece constituted by a second connecting rod 24 presenting a top end 24a connected to the front portion of the seat proper 14 and a bottom end 24b that is movable relative to the floor 12.

The top end 18b of the first connecting rod 18 is connected to the bottom portion 16a of the seat back 16 via a pivot connection to pivot about a transverse axis Y5 that is perpendicular to the first connecting rod 18.

The front portion 14a of the seat proper 14 is connected to the floor 12 via the second connecting rod 24. The second connecting rod 24 presents a bottom end 24b mounted on the floor 12 via a hinged connection, and a top end 24a mounted on the front portion 14a of the seat proper via a hinge connection Each of the hinged connections is pivotable about a respective transverse axis Y1, Y2 extending perpendicularly to the longitudinal direction X. Thus, the seat proper 14 can move about two pivot axis Y1, Y2 relative to the floor 12. The rear portion 14b of the seat proper 14 is connected to the bottom portion 16a of the seat back 16 so that the seat back 16 and the seat proper 14 can turn relative to each other about a transverse hinge axis Y3.

As shown in FIGS. 1 to 4, the seat 10 further includes a guide mechanism connected to the seat back and enabling it to be guided as it moves between the retracted and deployed positions. The guide mechanism comprises guide means 26, e.g. a wheel, placed on the bottom portion 16a of the seat back 16, and a guide 28, such as a rail, secured on a portion of the floor 12 (not visible in FIGS. 1 to 3). In a variant, the seat 10 may include a wheel 26 co-operating with the corresponding rail 28 on either side of the seat back 16.

The wheel 26 slides along the rail 28 which extends parallel to the longitudinal axis X between two ends 28a and 28b, each corresponding to the position of the wheel 26 when the seat 10 is retracted or deployed.

In a variant embodiment, the guide is constituted by a finger extending along a transverse axis perpendicular to the longitudinal axis X and sliding in a slot extending longitudinally in a rail that is secured to the floor.

To block the seat 10 in the deployed position, the seat includes a locking mechanism 30 that co-operates with a control mechanism 32. The dispositions described below can be used independently of those described above.

Figure 5:
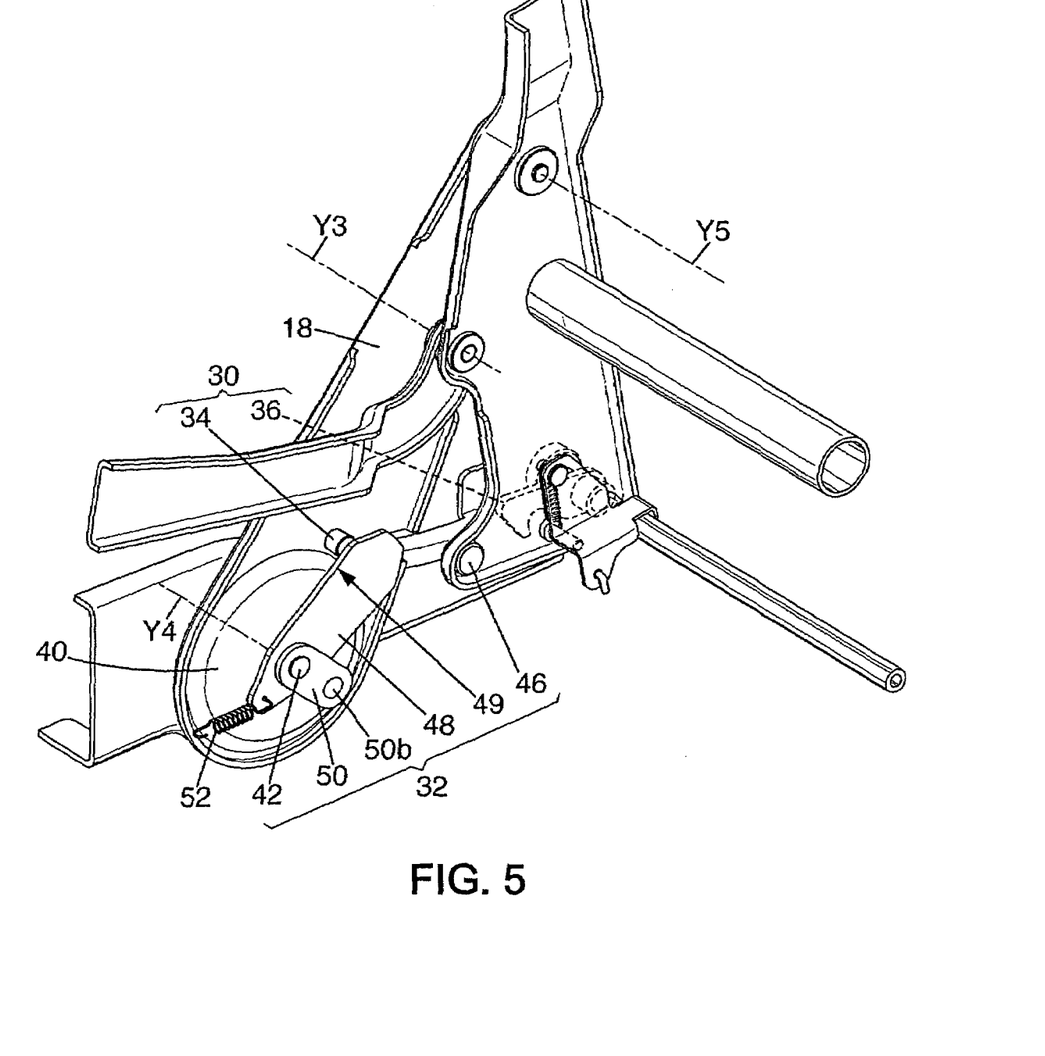
FIG. 5 is a detail view in perspective showing the mechanism for locking the seat back, the mechanism being shown in the unlocked position.
Figure 6:
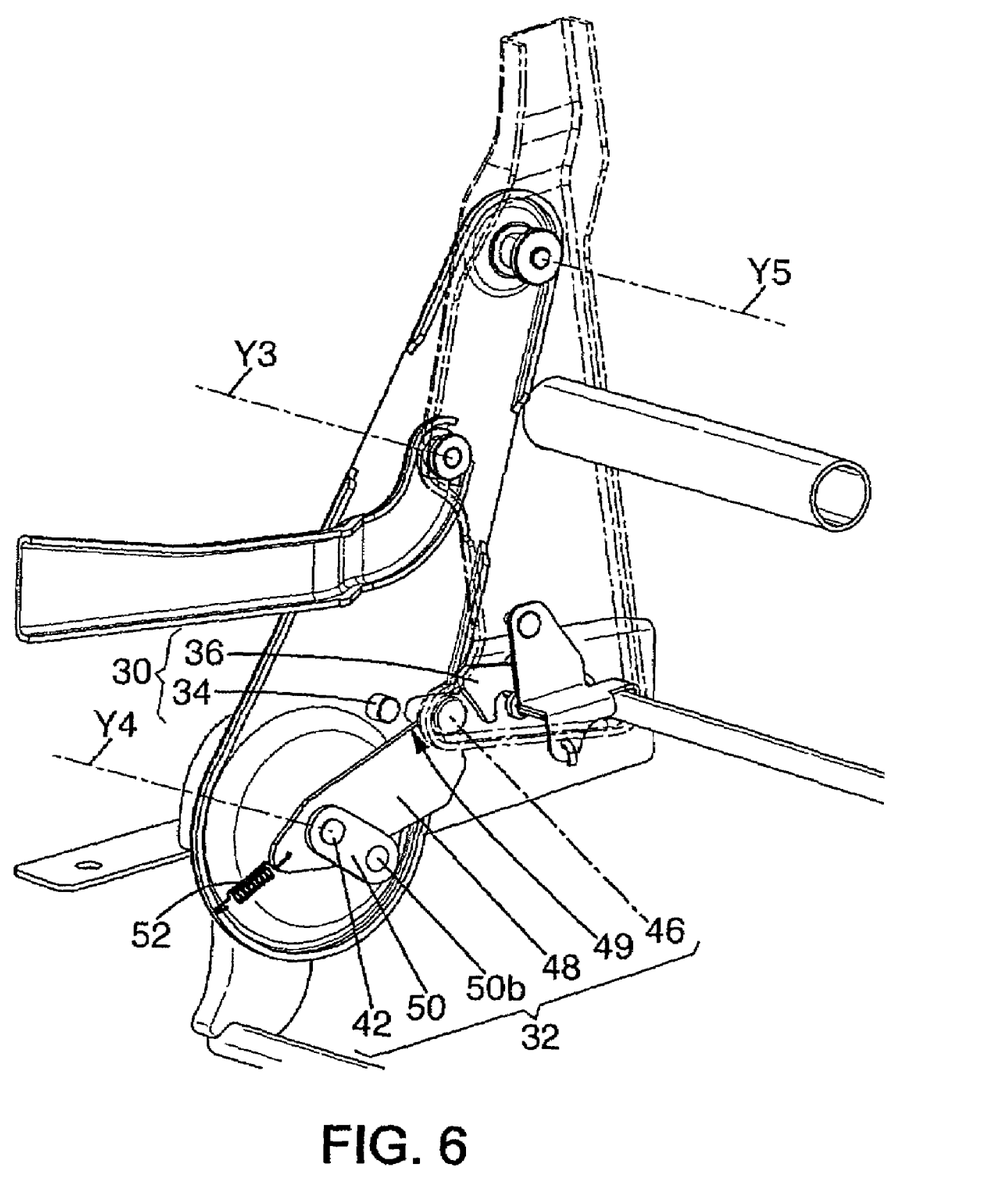
FIGS. 6 and 7 are diagrammatic views of the locking mechanism in an intermediate position and in the locked position.
Figure 7:
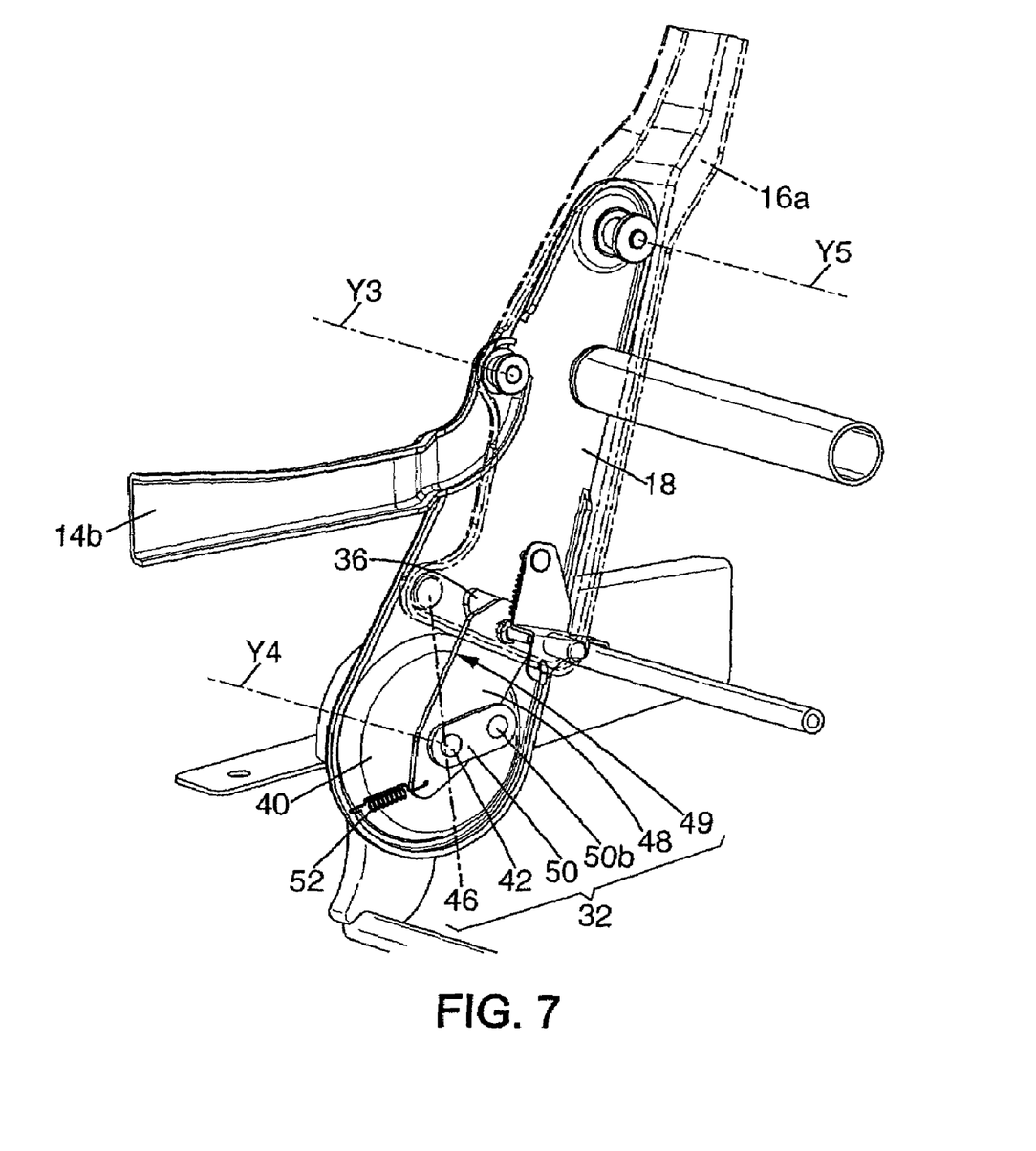

The locking mechanism 30 is described below with reference to FIGS. 5 to 7. Part of the rear portion 14b of the seat proper 14 can be seen in these figures.

The locking mechanism 30 comprises a peg 34 disposed on the first connecting rod 18, to extend along a transverse axis parallel to the axis Y. In addition it includes a hook 36 connected to the strength member of the bottom portion 16a of the seat back 16, and adapted to co-operate with the peg 34 to block or release pivoting of the seat back about the axis Y5. In a variant of the invention the peg 34 may be disposed on the seat back 16 of the seat 10 and the hook 36 on the first connecting rod 18.

The hook 36 is actuated by an external control 38, e.g. disposed on the top rear face of the seat back 16.

By way of example, this control may be in the form of a handle 38 acting via a system of cables to turn the hook 36 in order to disengage the peg 34.

The seat further comprises a hinge mechanism made up of two hinges 40 of known type, only one of which is visible in the figures. The two hinges 40 are secured to a synchronizing bar (not shown) by being connected to the ends thereof. The synchronizing bar serves to transmit movement from one of the hinges to the other so as to ensure that both hinges remain in the same position.

The hinge mechanism serves to change the angle of inclination of the seat back 16 relative to the floor 12. To do this, each hinge 40 comprises a first cheek plate secured to the floor 12 and a second cheek plate mounted on the bottom end 18a of the first connecting rod 18 and capable of turning relative to the first cheek plate about an axis of rotation Y4 by turning a control shaft 42 disposed on said axis. Such a hinge 40 can be locked in order to prevent such turning, or unlocked in order to allow it.

The hinge may be of the discontinuous type, as described in French patent application FR 2 743 764. The hinge is unlocked by means of a manual control (not shown), such as a strap connected to the hinge 40 and placed on the side of the seat where the seat proper and the seat back intersect. Thus, in the unlocked position, the hinge 40 enables the first and second cheek plates to turn freely relative to each other, so that the user can adjust the inclination of the seat back by acting directly on the seat back 16 over a determined range of angles.

In the accompanying figures, the first hinged cheek plate that is secured to the rail 28 is made integrally with the rail 28, and it is the rail that is secured to the floor 12. The portion of the floor to which the first cheek plate is secured is not shown in FIGS. 1 to 3. The second cheek plate is connected to the bottom portion of the first connecting rod 18, which includes a substantially circular housing suitable for receiving the elements making up the hinge 40.

The control mechanism 32 that co-operates with the locking mechanism 30 comprises an abutment 46, a cam 48, and a link 50.

The abutment 46 is secured to the bottom portion 16a of the seat back 16. This abutment 46 co-operates with the cam 48 that has a cam path 49, in such a manner as to cause it to pivot.

The cam 48 is pivotally mounted on the control shaft 42 to pivot about the pivot axis Y5, to move between an initial position and a working position. A return spring 52 urges the cam 48 towards its initial position.

The link 50 is mounted at a first end to the control shaft 42 on the axis Y4, and it presents a second end 50b that co-operates with the cam 48 via an abutment member (not visible in the figures) so as to cause the link to pivot about the axis Y4 and unlock the hinge.

The abutment member is secured to said link and is disposed between the link 50 and the first connecting rod 18. It extends along an axis parallel to the unlocking axis Y5.

In the unlocked position, the seat of the invention thus presents five hinge axes Y1, Y2, Y3, Y4, and Y5, e.g. pivot axes, disposed so as to obtain an optimized linkage for a seat 10 that is movable between a retracted position and a deployed position.

The seat 10 as described above operates as follows.

Figure 2:
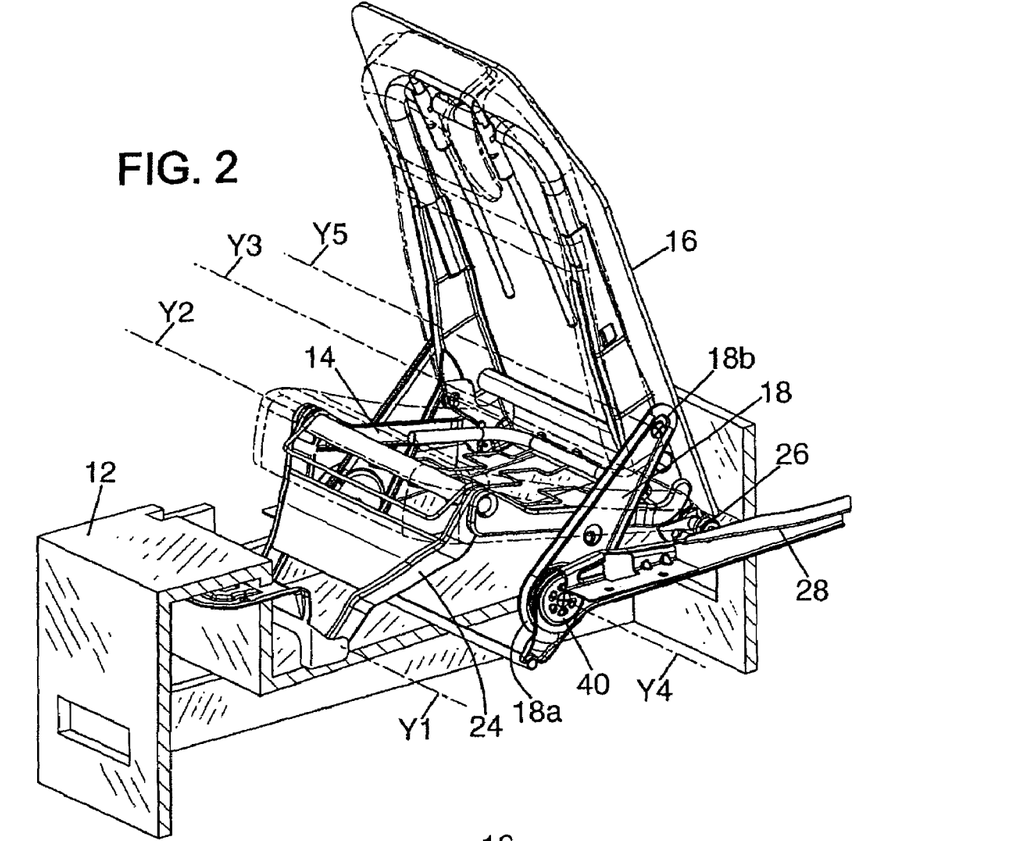
FIGS. 2 and 3 are diagrammatic views of the seat shown in FIG. 1, respectively in an intermediate position and in a retracted position in the floor.
Figure 3:
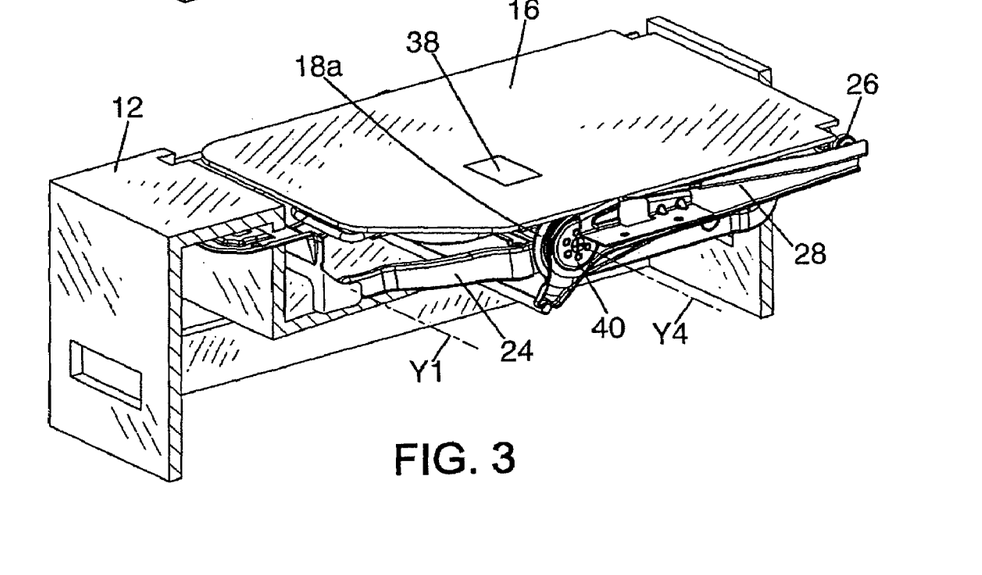
Figure 4:
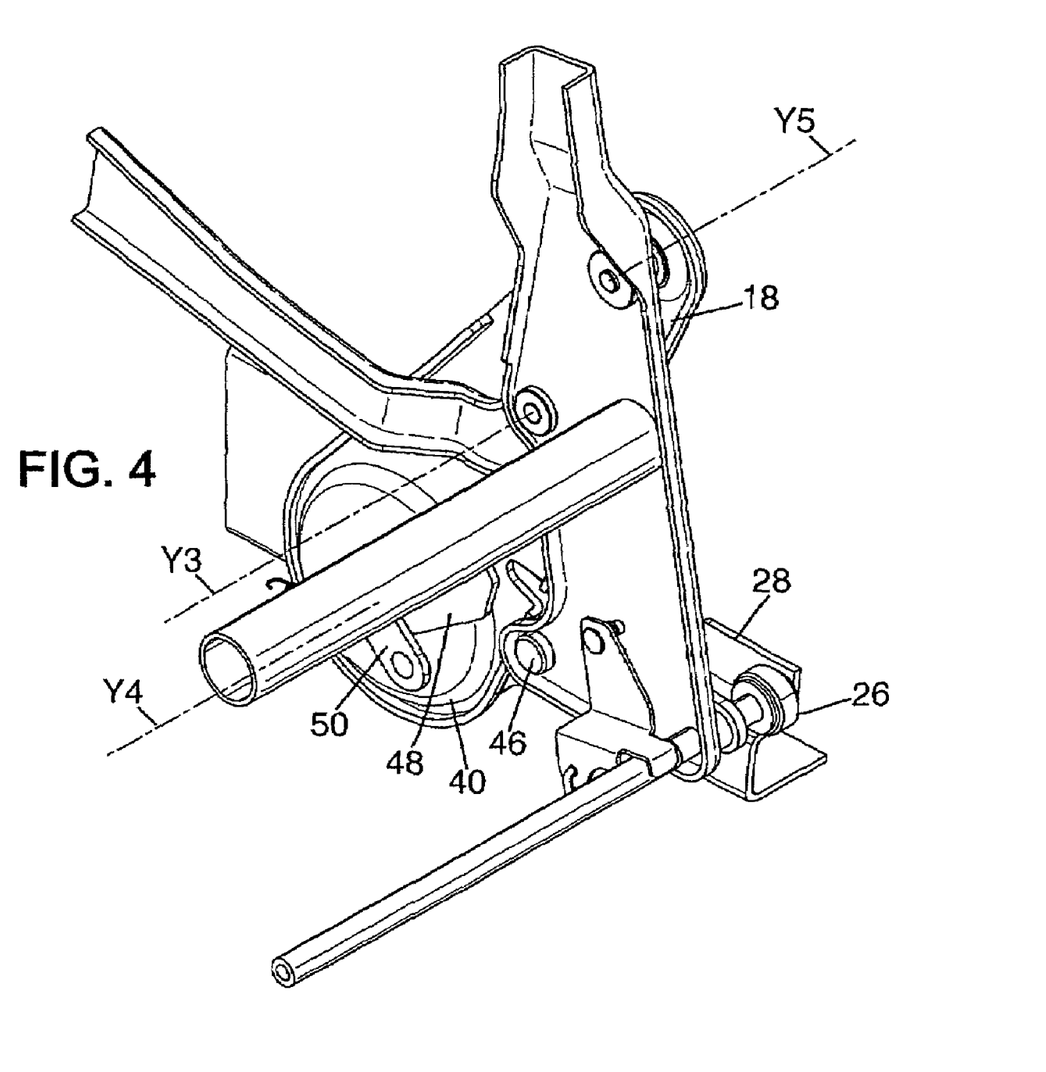
FIG. 4 is a detail view in perspective showing the portion of the seat that includes the guide mechanism.

FIGS. 1 to 3 show the seat 10 in three possible positions. FIG. 1 shows the seat 10 in a deployed position, i.e. in a utilization configuration.

FIG. 2 shows the seat in an intermediate position, i.e. a position that is unstable, serving to move the seat 10 into a retraced position as shown in FIG. 3.

In the deployed or utilization position, the position of the seat back 16 is blocked by the locking mechanism 30 which is in its locked position. That is to say the hook 36 is in engagement with the peg 34, thereby securing the seat back 16 and the first connecting rod 18 at the axis Y5. This blocks any pivoting movement of the seat back 16 relative to the first connecting rod 18 about the pivot axis Y5.

In addition, the hinge mechanism is locked, so the user can adjust the angle of inclination of the seat back 16 in order to adjust the comfort for the occupant by acting on the hinge 40 using the above-described strap. The seat back 16 pivots forwards under drive from at least one spring, or rearwards against the urging of the spring. Under such circumstances, the seat back pivots relative to the seat proper 14 about the axis Y3, and relative to the floor 12 about the axis Y4.

To bring the seat into the retracted position, the user actuates the external command 38 for controlling the locking mechanism 30, thus causing the hook 36 to release the peg 34. When the peg 34 is released, the seat back 16 can pivot about the pivot axis Y5, thus allowing the seat to be retracted into the housing in the vehicle.

Because the locking mechanism 30 is unlocked, the seat back 16 can pivot about the pivot axis Y5 independently of the position of the hinge, thereby actuating the control mechanism 32. The abutment 46 situated on the bottom portion of the seat back also pivots about the axis Y5. It then comes into contact with the cam 48 which is in its initial position, and drives the cam to pivot about the axis Y4 along the cam path 49.

An abutment member 50b co-operates with the cam 48 in such a manner that as the cam 48 pivots, one of its edges comes into contact with the abutment member 50b and causes the link 50 to turn about the axis Y4. The end of the link 50 secured to the control shaft 42 unlocks the hinge 40. With the hinge 40 unlocked, the first connecting rod 18 presents a hinge axis Y4 above which it can turn relative to the floor 12.

When the abutment 46 reaches the end of the cam path 49, it releases the cam 48 which turns in the opposite direction under drive from a spring 52 urging the cam 48 back towards its initial position.

When the locking mechanism and the hinge are both unlocked, the seat presents five hinge axes. In particular, the seat back 16 can pivot about the axis Y3 relative to the seat proper, and about the axis Y5 relative to the first connecting rod 18.

The wheel 26 or guided means, disposed on the bottom portion 16a of the seat back 16, guides and supports the seat back 16 as it moves, by means of the rail 28 in which it slides. The rail 28 thus defines a trajectory that the seat back 16 is constrained to follow while it is being displaced between the two positions.

Starting from the deployed position, a user can thus bring the seat easily into the retracted position, and in particular can do so with one hand only.

Advantageously, the external control 38 for unlocking the locking mechanism 30 is situated in the rear face of the seat back 16, so as to make it easier to take hold thereof with a single hand while moving the seat from one position to the other.

In the retracted position, the seat proper 14 folds under the seat back 16 of the seat 10 and the seat 10 is folded into the housing in the floor 12 so as to co-operate therewith to form a surface that is substantially plane, as shown in FIG. 3. Advantageously, the seat back includes carpeting on its rear face, which carpeting is identical to that lining the vehicle trunk, so as to obtain a trunk surface of substantially uniform appearance when the seat 10 is in the retracted position.

In order to return the seat into the deployed position from the retracted position, it suffices for the user to perform the same movements in the reverse order to that described above. The hinge 40 and the locking mechanism 30 are then locked automatically.

Figure 8:
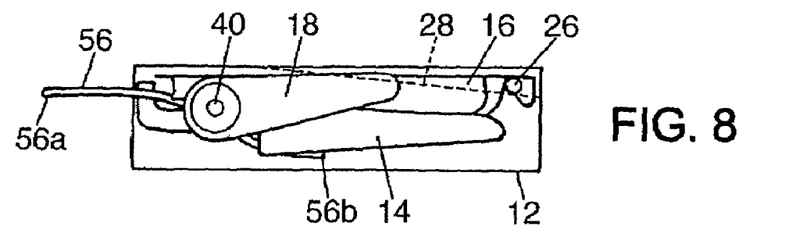
FIGS. 8, 9, and 10 show a seat in a second embodiment respectively in the retracted position, the intermediate position, and the deployed position.
Figure 9:
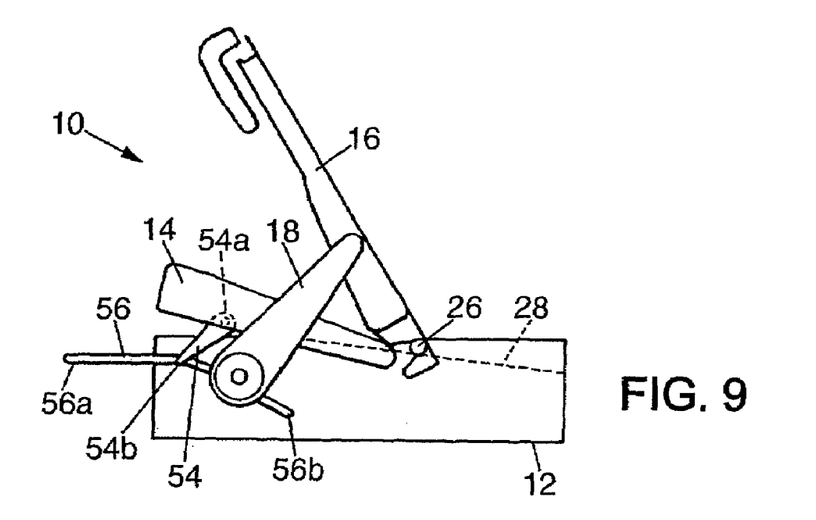
Figure 10:
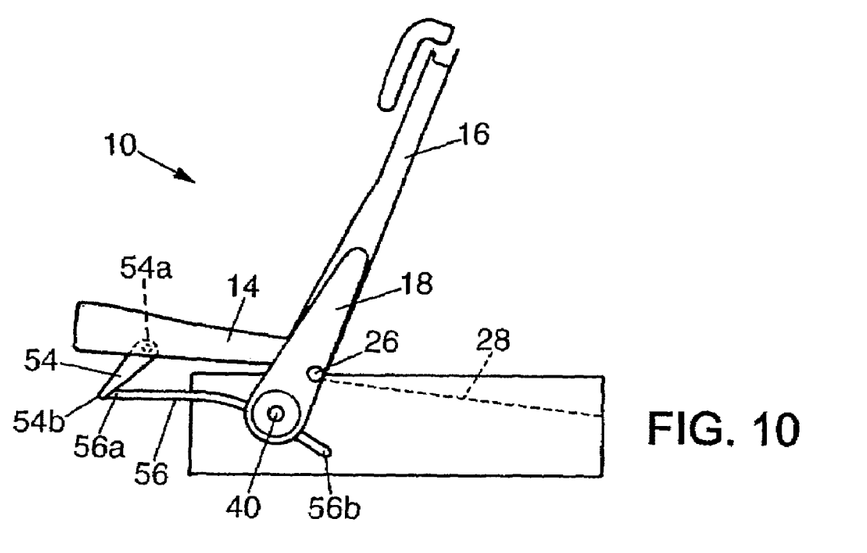

The invention can be embodied as a second embodiment as shown in FIGS. 8 to 10. In these figures, elements that are identical to the first embodiment are given the same references. The seat proper 14 is movable relative to the floor 12 by means of a connection piece 54. The connection piece 54 is hinged at its top end 54a relative to the seat proper 14 to pivot about an axis that is perpendicular to said piece 54, and it is slidably mounted in a rail 56 at its bottom end 54b, as shown in FIGS. 8 to 10.

The rail 56 extends between first and second ends 56a and 56b corresponding respectively to the position of the connection piece 54 when the seat 10 is in the deployed position and when it is in the retracted position. The second end 56b is curved towards the bottom of the housing formed in the floor 12 for receiving the seat 10 in the retracted position, thereby serving to lower the seat proper 14.

This second embodiment of the invention makes it possible to have the seat in a position that is further forwards relative to the housing.

What is claimed is:

1. A vehicle seat comprising:
   a seat back having a bottom portion and a top portion;
   a seat proper connected to the seat back and having a front portion and a rear portion; and
   a link mechanism designed to fasten the seat to a floor of a motor vehicle, and enabling it to be moved between a retracted position and a deployed position, the mechanism comprises at least:
   a first connecting rod presenting a bottom end designed to be hinged to the floor and a top end for hinging to the seat back; and
   a guide mechanism comprising a guide designed to be fastened to the floor, along which the bottom portion of the seat back is guided between the retracted and the deployed positions;
   wherein the rear portion of the seat proper is mounted to pivot relative to the bottom portion of the seat back, and wherein the link mechanism further comprises a connection piece presenting a bottom end designed to be mounted movably relative to the floor, and a top end hinged to the front portion of the seat proper.

2. A vehicle seat according to claim 1, in which the connection piece is a second connecting rod whose bottom end is designed to be hinged to the floor about a transverse axis perpendicular to said second connecting rod.

3. A vehicle seat according to claim 1, in which the bottom end of the connection piece is mounted to slide in a rail designed to be fastened to the floor.

4. A vehicle seat according to claim 1, in which the bottom portion of the seat back includes a wheel and the guide is a rail on which the wheel slides.

5. A vehicle seat according to claim 1, including a locking mechanism suitable for allowing or preventing pivoting of the seat back relative to the first connecting rod.

6. A vehicle seat according to claim 5, in which the locking mechanism comprises a hook secured to a first element selected from the first connecting rod and the seat back, and a peg secured to a second element selected from the first connecting rod and the seat back, and different from the first element, the hook and the peg co-operating in such a manner as to allow or prevent rotation of the seat back relative to the first connecting rod.

7. A vehicle seat according to claim 6, in which the hook is actuated so as to release the peg by using an external control.

8. A vehicle seat according to claim 1, in which the seat is adapted so that the seat back co-operates with the floor to form a surface that is substantially plane when the seat is in the retracted position.

9. A vehicle seat according to claim 1, further comprising a hinge mechanism connected to the seat back and adapted to modify an angle of inclination of the seat back about a transverse axis perpendicular to said hinge mechanism.

10. A vehicle seat according to claim 9, in which the hinge mechanism is situated at the bottom end of the first connecting rod designed to be hinged to the floor and is adapted to allow pivoting between the first connecting rod and the floor.

11. A vehicle seat according to claim 9, in which the hinge mechanism presents a first cheek plate designed to be connected to the floor and a second cheek plate formed by the first connecting rod.

12. A vehicle seat according to claim 9, including a control mechanism co-operating with a locking mechanism to cause the hinge mechanism to be locked or unlocked automatically during pivoting of the seat back relative to the first connecting rod.

13. A vehicle seat according to claim 12, in which the control mechanism includes an abutment situated on the seat back to co-operate with a cam in such a manner that pivoting of the seat back about the first connecting rod from the deployed position towards the retracted position causes the hinge mechanism to be unlocked automatically.

14. A vehicle including a floor, the vehicle including:
   a seat comprising:
      a seat back having a bottom portion and a top portion;
      a seat proper connected to the seat back and having a front portion and a rear portion; and
      a link mechanism designed to fasten the seat to the floor of the motor vehicle, and enabling it to be moved between a retracted position and a deployed position, the mechanism comprises at least:
         a first connecting rod presenting a bottom end hinged to the floor and a top end hinged to the seat back; and
         a guide mechanism comprising a guide fastened to the floor along which the bottom portion of the seat back is guided between the retracted and the deployed positions;
      wherein the rear portion of the seat proper is mounted to pivot relative to the bottom portion of the seat back, and wherein the link mechanism further comprises a connection piece presenting a bottom end mounted movably relative to the floor, and a top end hinged to the front portion of the seat proper.

15. A vehicle according to claim 14, in which the seat connection piece is a second connecting rod whose bottom end is hinged to the vehicle floor about a transverse axis perpendicular to said second connecting rod.

16. A vehicle according to claim 14, in which the bottom end of the connection piece is mounted to slide in a rail fastened on the vehicle floor.

* * * * *